June 12, 1923.
J. SACHS
1,458,728
ELECTRIC APPLIANCE RECEIVING AND METER PROTECTING BOX OR CASING
Filed April 2, 1918    2 Sheets-Sheet 1
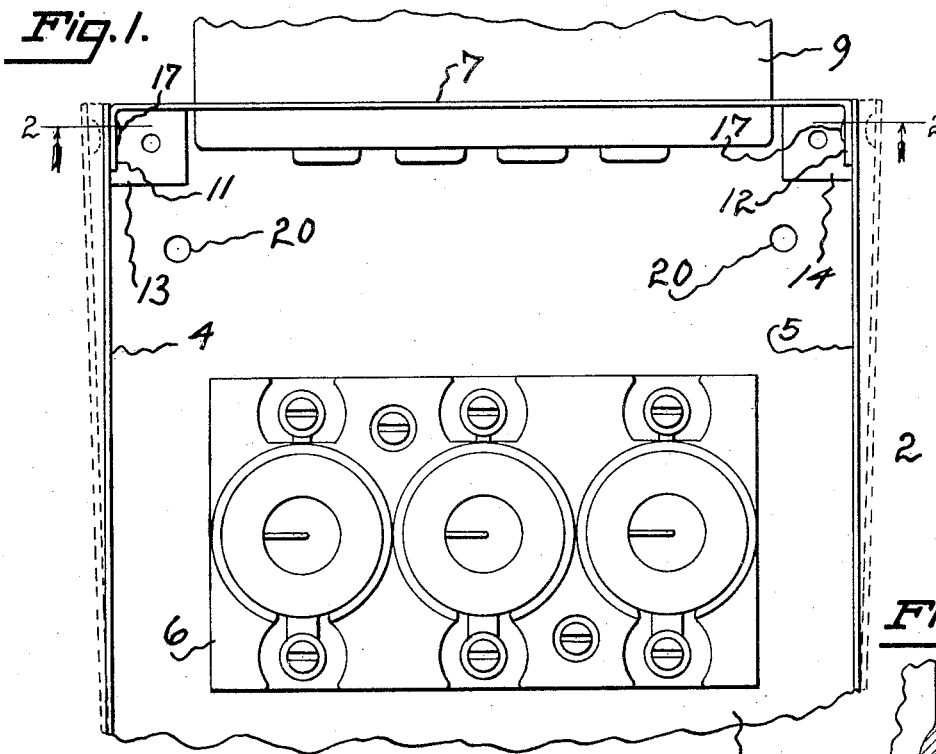
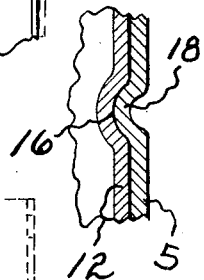
Inventor
Joseph Sachs
By Heath Sutherland
Attorney June 12, 1923. 1,458,728
J. SACHS
ELECTRIC APPLIANCE RECEIVING AND METER PROTECTING BOX OR CASING
Filed April 2, 1918 2 Sheets-Sheet 2
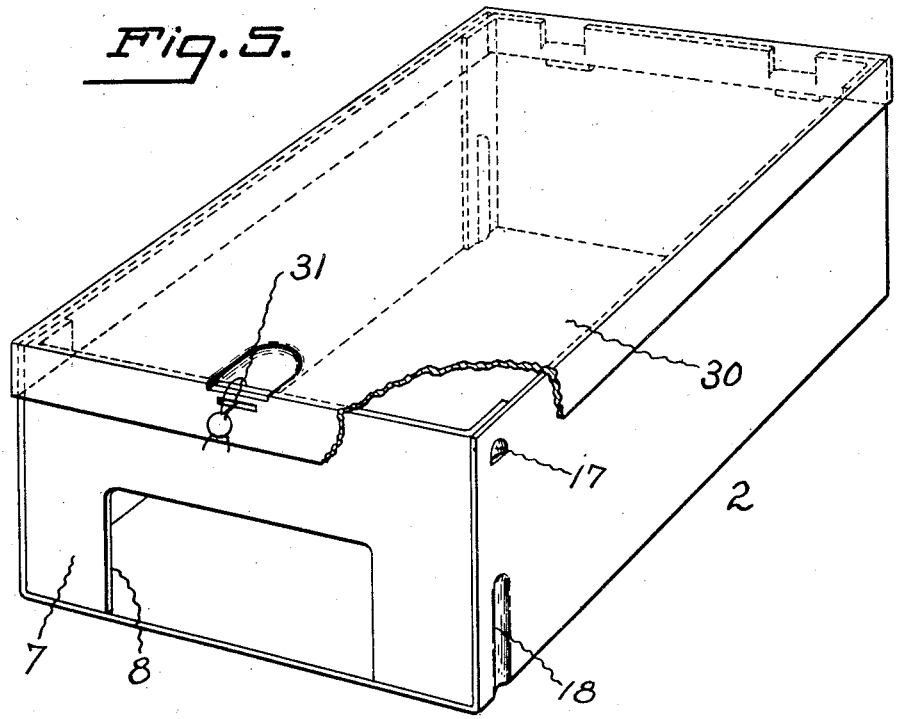

Patented June 12, 1923.

1,458,728

UNITED STATES PATENT OFFICE.

JOSEPH SACHS, OF HARTFORD, CONNECTICUT.

ELECTRIC-APPLIANCE-RECEIVING AND METER-PROTECTING BOX OR CASING.

Application filed April 2, 1918. Serial No. 226,254.

*To all whom it may concern:*

Be it known that I, JOSEPH SACHS, a citizen of the United States, residing at Hartford, in the county of Hartford and State of Connecticut, have invented certain new and useful Improvements in Electric-Appliance-Receiving and Meter-Protecting Boxes or Casings, of which the following is a specification.

This invention relates to electric appliance receiving and meter protecting box or casing. It is of particular utility in so-called meter installations where the electric supply wires are to be connected with certain electric connection or circuit controlling appliances and with a meter before they are carried to the translating devices served, this being merely an illustration of the several purposes accomplished by my invention in the electric art. More specifically my invention relates to that type of devices in which the circuit controlling instrumentality is located within a box or casing and is protectively housed therein, while the meter or a part thereof is also protectively encased. In the particular embodiment of my invention herein shown and described, the meter protective functioning is obtained by the projection of a part of the meter (the terminal chamber) through a part of the casing and into the interior thereof, this portion of the casing being easily insertible and removable from the other coacting parts of the casing.

Referring to said drawings:

Figure 1 is a front view showing a casing with the lower portion broken away and a circuit controlling appurtenance mounted in said casing and also part of the terminal chamber of a meter projecting into the casing.

Fig. 2 is a transverse section on the line 2—2 of Fig. 1, looking in the direction of the arrows.

Fig. 3 is an enlarged view showing one of the side walls of the casing spread or deflected into position to unlock or release the removable portion.

Fig. 4 is a transverse section on the line 4—4 of Fig. 2, looking in the direction of the arrows.

Fig. 5 is a perspective of an electric appliance receiving and meter protecting equipment with a cover.

Like characters refer to like parts throughout the several views.

Referring now particularly to the several views, 2 represents the body of a casing usually comprising a back 3, side walls 4 and 5 and a bottom end wall. As shown the circuit-controlling and connecting device or appliance 6 is mounted on what I have termed the "back." This, as will be clear, is not a vital condition. What is shown as the upper end wall 7 may be called the meter protecting end wall or a plate adapter, it being provided with a cut or opening 8 of such conformation as to straddle the terminal chamber 9 of the meter protectively combined with the casing. The manner in which this meter is protectively arranged by the projection of the terminal chamber through a closure plate or a meter protecting wall of which that denoted by 7 is an illustration, is now well understood in the art. In order to properly protect the meter it is important that the wall 7 be securely held in locked relation with the side walls 4 and 5, while at the same time in order to provide for the simple and expeditious placement, adjustment and manipulation of the meter when necessary, it is desirable that this meter protecting end wall be quickly removed without the necessity of tools, such as a screw driver. The meter protecting end wall 7 in the particular form herein shown has in addition to the body, which is provided with the opening or meter straddling cut 8, the side flanges 11 and 12 and may also be provided with the base or bottom flanges 13 and 14. The side flanges are provided preferably at a point close to the top and at the front or cover side of the casing, with the holes or openings 15, and these side flanges 11 and 12 are also provided with the grooves or channels 16 at the rear of the casing extending transversely of the casing as shown. The side walls 4 and 5 are each provided with tongues or projections as 17 which are inwardly directed and positioned, so that when the end wall 7 is in its proper place between the side walls, the tongues 17 project into or through the openings 15. In addition to the tongues each of the side walls 4 and 5 has the inwardly directed transverse bead or projection 18, and this projection or bead 18 in each case is so positioned as to enter and interlock with the groove or channel 16 in each of the side flanges of the end wall.

The side walls of the casing and the flanges 11 and 12 thus in themselves constitute spring snap fasteners for the box or casing is preferably constructed of sheet metal such as for instance iron or steel. Constructed of such material the side walls or members possess sufficient resiliency both flexibility and elasticity, so that they may be spread outwardly to enlarge the opening between them, or when released they will snap back to their normal position, so that when the end wall 7 is in place between the side walls, these side walls 4 and 5 when released will when they snap back, firmly abut against and hug the flanges 11 and 12 of the end wall 7. The tongue 17 and ribs or projections 18 in each of the side walls will cooperatively project through or into the openings 15 and the grooves 16 in the side flanges of the end wall. When so engaged the end wall is firmly latched to the side walls. The complete casing as is usual and as well known in such devices, is provided with a cover to close up the front and prevent access to the interior of the casing or box when the cover is in position and preferably sealed. The form of such covers is well-known, consisting of the front which is provided with flanges which overlap around the side and end walls already described and which cover may be suitably hinged or otherwise held to the side or end walls and sealed. When such a cover as 30 is in place straddling the casing, the side walls 4 and 5 cannot then be spread apart, on account of the overlapping engagement of the cover flanges therewith and in consequence the side walls and the end walls are locked together. It is usual in such casings or housings where these are provided with the back as 3 to provide perforations such as 20 through which suitable holding screws are passed to mount a cabinet, box or housing on the support.

In order to now more clearly understand the precise cooperative functioning of the interrelated parts, I will in a general way describe the procedure making an installation combining my protective casing with a meter. Assuming that the particular casing is practically like that shown and described and has a suitable circuit protective device or appliance mounted therein, the complete casing will first be mounted on the supporting wall. The meter which may be of the terminal chamber type such as described is then mounted and positioned in such relation to the cabinet or housing that a suitable part of the terminal chamber thereof will project into the casing. It will be understood that the end wall 7 may remain in place when the meter is so mounted, yet this is not an essential consideration. It is, however, preferable to permit it to remain in place so as to properly position the meter with the cabinet proper. After the meter and the cabinet have been properly placed, and should the end wall be in place between the side walls of the cabinet, it may now be removed by simply spreading the side walls apart as shown by the dotted lines in Figs. 1 and 2, and the end wall 7 can then be bodily slipped or pulled out of its normal meter protecting position as indicated particularly in Fig. 2 by the dotted lines. When the meter protecting end wall 7 has been thus removed and the meter terminal chamber freed from any straddling protective engagement therewith, the cover to the terminal chamber of the meter may be taken off and the circuit wire suitably connected with the contacts or connections therein. After this has been done the side walls of the cabinet or box may again be spread, the end wall 7 pushed into position between, the side walls which thereupon snap into engagement with it, hugging the meter protecting end wall and the tongues 17 and beads 18 will suitably engage and interlatch with the apertures or openings 15 and grooves 16. The cover is then closed with its flanges overlapping around the side walls and end walls, so that the side walls cannot be spread open so long as the cover is in place and its flange overlaps in the manner described, this overlapped relationship being maintained by sealing at 31 the cover in position. It will be observed that the latching lug or tongue member 17 on each side is in line with the bead 18 and groove 16 and accordingly when the end wall plate is pushed in between the side walls depthwise of the casing, the grooves 16 first ride over the tongues 17 and by continued movement engage with the beads 18, until the lug fasteners snap into position, the plate being thus guided and steadied during the act of insertion, which is an important convenience. Furthermore the interlock of the beads and grooves serves to prevent displacement of the plate in the end of the casing, either inwards or outwards, after it has been inserted, while the interlock of the lug or tongue 17 with the hole 15 restrains the plate from sliding out of place on the bead formation thereby guarding against accidental displacement when the cover is open.

In the particular construction shown I have provided projections on the side walls which enter into coacting receiving apertures, grooves or seats in the coacting end wall, but it is clear that this is simply one of the arrangements possible to accomplish the desired result within the spirit of the invention. For instance the relationship of the interlocking elements may be otherwise obtained. The particular manner in which the meter is protected by a projection of a portion thereof into the cabinet through the meter protecting end wall is a simple and efficacious method of producing the protective result with meters having terminal chambers. Where so-called side wire meters are used, the end wall 7 may be provided with additional adjunctive parts to extend therefrom and which suitably protectively engage with such meters.

What I claim is:

1. A casing for an electric appliance comprising movable side walls and a meter protecting end wall snap engageable into locked relation with said side walls when in their normal positions, a cover overlapping the side and end walls and preventing the movement of the side walls when said cover is in place while permitting said movement when said cover is open for thus permitting the removal of the meter protecting end wall from the side walls.

2. A meter installation comprising an appliance receiving casing, a meter adjacent thereto, an adapter member completing the enclosure of the appliance and the wire connections between the appliance and the meter, the side walls of the casing adjacent the adapter member being flexible for releasably latching said adapter member to the casing, and a movable member engaging said flexible side walls and preventing release of the adapter member.

3. A meter installation comprising an appliance-receiving casing, a meter adjacent thereto, an adapter member and a cover for the casing, said casing and the adapter being mutually provided with interlocking means to latch said adapter member in place and said cover being organized to engage said interlocking means to obstruct opening movement of the same and thereby to prevent the removal of the adapter member when the cover is closed.

4. A meter installation comprising an appliance-receiving casing formed of sheet metal, one end of which is open and the side walls of which are elastic and adapted to be sprung out of normal position, a meter adjacent the open end of the casing, an adapter member for the open end, said adapter member and the adjacent portions of said side walls of the casing being respectively directly provided with complementary latching notches and projections mutually organized whereby the adapter member is interlocked with a side wall by virtue of the spring action of the latter, and a flanged cover engaging the said side wall and adapter to fix the position thereof and thereby lock the projections in the notches.

5. A meter installation comprising an appliance-receiving casing, a meter adjacent thereto, an adapter member completing the enclosure of the appliance and the wire connections between the appliance and the meter, said adapter having marginal flanges to set within the casing and engage with opposite side walls thereof and said flanges and opposite side walls being respectively provided with complementary latching notches and projections, said side walls being elastic to effect interlocking thereof, and a cover for the casing overlapping the said elastic side walls to hold said walls in latching position.

6. A meter installation comprising an appliance-receiving casing, a meter adjacent thereto, an adapter member completing the enclosure of the appliance and the wire connections between the appliance and the meter, said adapter and opposite side walls of the casing being provided with a complementary bead and groove formation extending depthwise of the casing and with a latching projection and notch forming latching means, said bead and groove formation serving to guide the adapter into position for the engagement of said latching means and a cover for the casing serving to lock said latching means against separation.

7. A meter installation comprising an appliance-receiving casing one end of which is open, a meter arranged partly within said open end, a substantially flat plate constituting an adapter completing the enclosure of the casing, said adapter and a side wall of the casing being respectively provided with a complementary latching projection and notch adapted to be engaged and disengaged by bending said side wall and a cover for the casing having a flange to engage said wall and prevent its flexure to unlatching position when the cover is closed.

8. A meter installation comprising an appliance-receiving casing having an open end, a meter partly within said end, a substantially flat plate adapted to complete the enclosure of the casing and the connections between the meter and the appliance within the casing, said plate and a side wall of the casing being respectively provided with a bead and groove interlocking formation and with latching means releasable by bending the casing wall, and a cover for the casing having a part to engage said wall to prevent unlatching of said means when the cover is closed.

9. A meter installation comprising an appliance-receiving casing, a meter adjacent thereto, a plate-form adapter having a flange, said adapter flange and the adjacent side wall of the casing having a bead and groove formation and a tongue member for latching the adapter to the casing against withdrawal lengthwise of said bead and groove formation, the said casing side wall being elastic and adapted to provide a snap latching engagement for said parts, and a cover engaging said side walls and thereby preventing the unlatching of said parts.

10. A meter installation comprising an appliance receiving casing, a meter located adjacent thereto for electrical connection to the appliance within the casing, an adapter, elastic means for latching the adapter in place, and means for preventing the opening of the casing, said last mentioned means protecting the said elastic adapter-latching means so that the latching means is releasable only after the means preventing the opening of the casing is released.

11. A meter installation comprising an appliance-receiving casing, a meter located adjacent one side thereof for electrical connection to the appliance contained within the casing, an adapter correlated to the casing for application to said side of the casing by movement crosswise of the casing, and complementary spring latching means on the casing and adapter respectively for latching the adapter to the casing when the adapter is applied to the latter by said crosswise movement, said latching means being so related to the casing and adapter as to be accessible for release only when the casing is open.

12. A meter installation comprising an appliance-receiving casing open at one end, a meter adjacent said open end, and a flanged adapter completing the enclosure of the appliance and the wire conection between the same and the meter, the flange on said adapter and the adjacent side wall of the casing, at said open end, being respectively provided with complementary interlocking means including a latching member and an aperture, a cover for said casing adapted to obstruct the disengagement of said latching member from said aperture when the cover is closed and means for sealing the cover in closed position.

13. A meter installation comprising an appliance-receiving casing one end of which is open, a meter arranged partly within said open end, a substantially flat plate constituting an adapter completing the enclosure of the casing, said adapter and a side wall of the casing respectively provided with a complementary latching projection and notch adapted to be engaged and disengaged by bending said side wall, a cover for the casing having a flange to engage said wall and prevent its flexure to unlatching position when the cover is closed, and a seal co-acting with holes in said cover and flat plate.

In testimony whereof I affix my signature in the presence of two witnesses.

JOSEPH SACHS.

Witnesses:
L. L. MARKEL,
HEATH SUTHERLAND.